US009390580B2

(12) United States Patent
Detlefsen et al.

(10) Patent No.: US 9,390,580 B2
(45) Date of Patent: Jul. 12, 2016

(54) INTEGRATING WAGERING GAMES AND PLAYER COMMUNITIES

(75) Inventors: David E. Detlefsen, Northfield, IL (US); Sean P. Kelly, Skokie, IL (US); Darren Yat-man Ng, Chicago, IL (US); Nickey C. Shin, Chicago, IL (US)

(73) Assignee: BALLY GAMING, INC., Las Vegas, NV (US)

(*) Notice: Subject to any disclaimer, the term of this patent is extended or adjusted under 35 U.S.C. 154(b) by 865 days.

(21) Appl. No.: 13/487,147

(22) Filed: Jun. 1, 2012

(65) Prior Publication Data

US 2013/0122995 A1 May 16, 2013

Related U.S. Application Data

(60) Provisional application No. 61/492,543, filed on Jun. 2, 2011.

(51) Int. Cl.
*G06F 17/00* (2006.01)
*G07F 17/32* (2006.01)

(52) U.S. Cl.
CPC .................................. *G07F 17/3225* (2013.01)

(58) Field of Classification Search
None
See application file for complete search history.

(56) References Cited

U.S. PATENT DOCUMENTS

| | | | | |
|---|---|---|---|---|
| 6,312,334 | B1 * | 11/2001 | Yoseloff | G07F 17/32 273/138.1 |
| 6,554,707 | B1 * | 4/2003 | Sinclair | A63F 13/12 455/461 |
| 7,654,897 | B2 * | 2/2010 | Devaull | G07F 17/32 463/20 |
| 8,172,687 | B2 | 5/2012 | Gagner et al. | |
| 8,777,721 | B2 * | 7/2014 | Kato | G07F 17/3244 463/20 |
| 2002/0187827 | A1 * | 12/2002 | Blankstein | G07F 17/3244 463/20 |
| 2003/0003997 | A1 | 1/2003 | Vuong et al. | |
| 2005/0026669 | A1 * | 2/2005 | Nelson | G07F 17/3267 463/16 |
| 2005/0054446 | A1 | 3/2005 | Kammler et al. | |
| 2005/0101368 | A1 * | 5/2005 | Thomas | G07F 17/32 463/16 |
| 2006/0025205 | A1 * | 2/2006 | Casey | G07F 17/3244 463/20 |
| 2006/0121979 | A1 * | 6/2006 | Kennard | G07F 17/32 463/25 |
| 2006/0211493 | A1 * | 9/2006 | Walker | G06Q 30/02 463/29 |

(Continued)

*Primary Examiner* — Paul A D'Agostino

(74) *Attorney, Agent, or Firm* — DeLizio Law, PLLC

(57) ABSTRACT

In some embodiments of the inventive subject matter, a method includes: presenting a wagering game on a wagering game machine; detecting, during the wagering game, a trigger for a bonus game; presenting player-selectable bonus game options on a display device of the wagering game machine; detecting sign-on to an account on a player community server; after detecting the sign-on of the account, presenting a hint on the display device, wherein the hint indicates bonus game types associated with the player-selectable bonus game options; detecting selection of one of the player-selectable bonus game options, wherein the one of the player-selectable bonus game options is associated with a particular one of the bonus game types; and presenting a bonus game of the particular one of the bonus game types.

25 Claims, 8 Drawing Sheets

(56) References Cited

U.S. PATENT DOCUMENTS

| | | | | |
|---|---|---|---|---|
| 2007/0167226 | A1* | 7/2007 | Kelly | G07F 17/32 463/29 |
| 2007/0259709 | A1* | 11/2007 | Kelly | G07F 17/3267 463/20 |
| 2008/0026822 | A1* | 1/2008 | Walker | G07F 17/32 463/25 |
| 2008/0039196 | A1* | 2/2008 | Walther | G07F 17/32 463/27 |
| 2008/0182650 | A1* | 7/2008 | Randall | G07F 17/32 463/25 |
| 2009/0075738 | A1* | 3/2009 | Pearce | G07F 17/32 463/42 |
| 2009/0098930 | A1* | 4/2009 | Kato | G07F 17/3244 463/20 |
| 2009/0117979 | A1* | 5/2009 | Decasa, Jr. | G07F 17/32 463/20 |
| 2010/0048293 | A1* | 2/2010 | Hornik | G07F 17/34 463/25 |
| 2010/0062840 | A1* | 3/2010 | Herrmann | 463/25 |
| 2010/0087256 | A1* | 4/2010 | Frattinger | G07F 17/32 463/42 |
| 2010/0105454 | A1* | 4/2010 | Weber | G06Q 30/02 463/1 |
| 2010/0120485 | A1* | 5/2010 | Moody | G07F 17/32 463/13 |
| 2010/0120503 | A1* | 5/2010 | Hoffman | G07F 17/3272 463/20 |
| 2010/0317442 | A1* | 12/2010 | Thomas | G06Q 30/02 463/42 |
| 2011/0009188 | A1 | 1/2011 | Adiraju et al. | |
| 2011/0021263 | A1 | 1/2011 | Anderson et al. | |
| 2011/0028202 | A1* | 2/2011 | Naicker | G07F 17/3244 463/20 |
| 2011/0028203 | A1 | 2/2011 | Agarwal et al. | |
| 2011/0028207 | A1 | 2/2011 | Gagner et al. | |
| 2011/0111860 | A1* | 5/2011 | Nguyen | G07F 17/32 463/42 |
| 2011/0143841 | A1 | 6/2011 | Allen et al. | |
| 2011/0207525 | A1 | 8/2011 | Allen et al. | |
| 2011/0218044 | A1* | 9/2011 | Joshi | G06Q 30/0257 463/37 |

* cited by examiner

INTEGRATING WAGERING GAMES AND PLAYER COMMUNITIES

RELATED APPLICATIONS

This application claims the priority benefit of U.S. Provisional Application Ser. No. 61/492,543 filed Jun. 2, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to integration of wagering games and virtual player communities.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example systems and components. The third section describes example operations, whereas the fourth sections provides more information about wagering game machines. The fifth section provides some general comments.

INTRODUCTION

This section provides an introduction to some embodiments of the invention.

With the advent of social networking on the internet, some social networking websites have been tailored to cater to wagering game players. These websites create virtual communities in which players can socialize and exchange information about gaming topics. The virtual player communities ("player communities") include groups of people who choose to associate and interact with each other via blogs, chat rooms, newsgroups, email, discussion boards or forums, instant messaging, and/or other electronic facilities. Members of a player community often share a set of common interests and experiences, such as an interest in a particular wagering game.

In some instances, player community websites are offered by wagering game machine manufacturers, as a way of promoting interest and revenue for the wagering game machines. Some embodiments of the inventive subject matter link play on wagering game machines to use of player communities. As a result, some embodiments enable players to sign-on to player community websites while playing wagering games on wagering game machines. If players have signed-on to player community websites, some embodiments give those players information about wagering games on the wagering game machines. For example, if a player signs-on to a player community during a gaming session on a wagering game machine (e.g., in a casino), the player may receive information that identifies player-selectable game elements that trigger certain types of bonus games. The player can use the information to pick a desired bonus game type. Without the information, the player would "blindly" pick a game element without knowing what bonus game type the element triggers. In some embodiments, instead of revealing bonus game types, the information identifies game elements that trigger bonus games of a given volatility. In yet other embodiments, the information reveals statistics about wagering games or bonus games.

Figure 1:
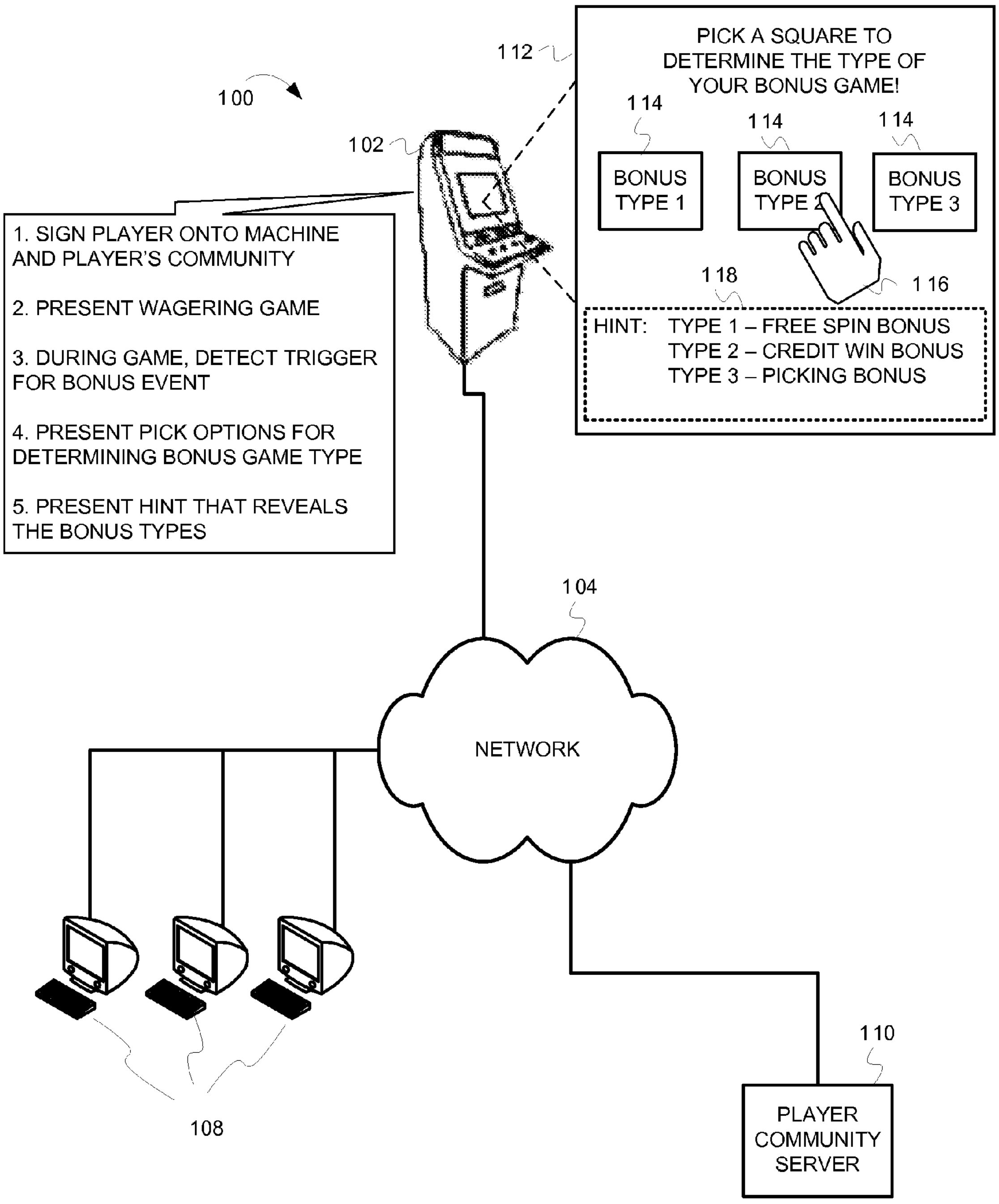
FIG. 1 is a block diagram showing a wagering game system that rewards players for signing-on to player communities during wagering game sessions.

Although some embodiments enable players to use information to pick bonus game types, those embodiments do not provide information that affects expected values of wagering games. That is, the information does not increase players' likelihood of winning, but instead allows players to choose game types they prefer. Moreover, some embodiments enable players to sign-on to the player communities using wagering game machines, whereas other embodiments enable players to sign-on to player communities using mobile phones or other computing devices. FIG. 1 shows an example of how a wagering game system can reward players for signing-on to player communities.

FIG. 1 is a block diagram showing a wagering game system that rewards players for signing-on to player communities during wagering game sessions. In FIG. 1, a system 100 includes a wagering game machine 102, player community server 110, and computing devices 108. These components are connected by a network 104.

As noted above, the player community server 110 can host a virtual community in which players can share information, socialize, monitor activities in a casino, and more. For example, users can access the player community server 110 via the computing devices 108, which can be home computers, laptops, or other devices capable of accessing the player community server 110 via the network 104. In some instances, the computing devices 108 can access the player community server 110 via a web browser and the Internet. The player community server 110 is also accessible via the wagering game machine 102. For example, in a casino, a player can use the wagering game machine 102 to sign-on and access functionality (e.g., access blogs, chat rooms, gaming information, etc.) of the player community server 110. In turn, the wagering game machine 102 may reward the player for signing-on to the community server 110.

FIG. 1 shows operations in five stages. At stage 1, the wagering game machine 102 signs-on a player to a wagering game session on the machine 102. Additionally, the wagering game machine 102 contacts the player community server 110 to facilitate signing-on the player to a player community. Thus, after stage 1, the player has signed-on to a player community during a wagering game session.

During stage 2, the wagering game machine 102 presents a wagering game, such as video slots, video poker, etc. Although not shown, the wagering game machine 102 presents media (e.g., graphics and sound) representing the wagering game. During stage 3, as part of the wagering game, the wagering game machine 102 detects a bonus event trigger, which indicates that the player has triggered a bonus game. In some embodiments, as part of the bonus game, a player is asked to select one of a plurality of graphical game elements 114. The player's selection determines a bonus game type.

In FIG. 1, a game window 112 shows how the machine 102 may display the graphical game elements 114. In FIG. 1, the graphical game elements 114 are presented side-by-side in a row, but can be arranged in any suitable matter. Each of the graphical game elements 114 is associated with a different bonus game type. For example, the leftmost element 114 may be associated with a free-spin-type bonus game, whereas the center element 114 may be associated with a credit-win-type bonus game, and the rightmost element 114 may be associated with a picking-type bonus game. However, the elements 114 themselves do not indicate a type of bonus game with which they are associated. Because the player has signed-on to a player community, the wagering game machine 102 offers a hint 118 about the graphical game elements 114.

During stage 5, the wagering game machine 102 presents the hint 118. The hint 118 indicates the type of bonus game associated with each graphical game element 114. As a result, the player 116 can select whichever bonus game type the player prefers. In some embodiments, the wagering game machine 102 will not present the hint unless the player has signed-on to a player community. As a result, the player receives a benefit for signing-on to the player community.

In other embodiments, instead of signing-on the player during the wagering game session (e.g., at stage 1), the machine 102 determines whether the player is a member of a player community. The machine 102 may send an inquiry to the server 110 without signing-on the player to the player community. If the player is a player community member, the machine 102 can present the hint 118 (e.g., at stage 5). Some embodiments are not limited to rewarding players with information about bonus games. Such embodiments can reward players with prizes, virtual status, virtual goods, virtual currency, etc.

Player Communities

Player communities (a.k.a., "virtual communities") include groups of people who choose to associate and interact with each other via web sites, chat rooms, newsgroups, email, discussion boards or forums, instant messaging, and/or other electronic facilities. Members of a community often share a set of common interests and experience (e.g., an interest in a particular wagering game). According to embodiments, communities offer a rich infrastructure which enables community members to:

- Create Social Networks—When creating social networks, members can create electronic associations that inform network members when selected members are: 1) online, 2) performing activities, 3) reaching milestones, 4) etc.
- Establish a Reputation—Community members can establish reputations based on feedback from other community members, based on accomplishments in the community, based on who is in their social network, etc.
- Provide Content—Community members can provide content by uploading media, designing wagering games, maintaining blogs, etc.
- Filter Content—Community members can filter content by rating content, commenting on content, or otherwise distinguishing content.
- Interact with Other Members—Community members can interact via newsgroups, e-mail, discussion boards, instant messaging, etc.
- Participate in Community Activities—Community members can participate in community activities, such as multi-player games, interactive meetings, discussion groups, real-life meetings, etc.

Example Systems and Components

This section describes addition system architectures, functionalities, and data flow of various example embodiments.

Example Systems

Figure 2:
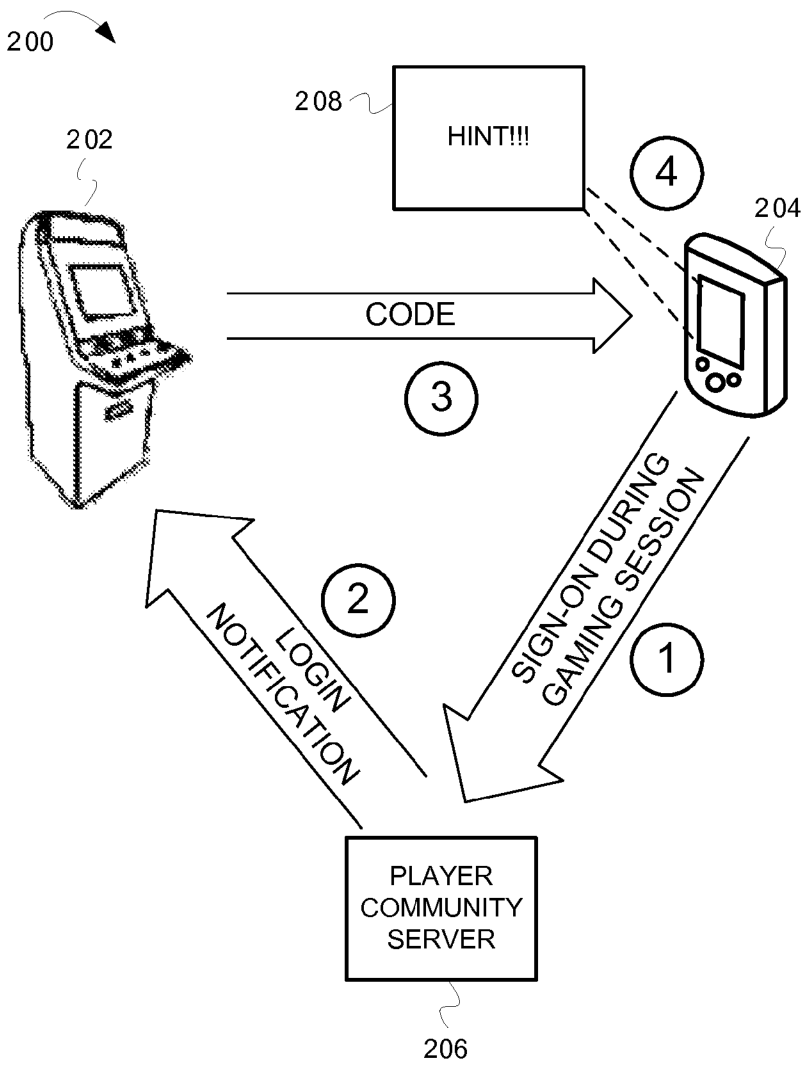
FIG. 2 is a block diagram illustrating components, operations, and dataflow of a system that presents hints to players who have signed-on to player communities.

FIG. 2 is a block diagram illustrating components, operations, and dataflow of a system that presents hints to players who have signed-on to player communities. In FIG. 2, a system 200 includes a wagering game machine 202, mobile device 204 (e.g., mobile phone), and player community server 206. The system 200 enables a player to receive a hint 208 on the mobile device 204, where the hint 208 reveals information about a wagering game being presented on the wagering game machine 202. In some embodiments, the mobile device 204 includes a client component suitable for exchanging information with the player community server 206. The dataflow and operations occur in four stages.

During stage 1, a mobile device 204 enables a player to sign-on to a player community hosted on the player community server 206. The sign-on occurs while the player is participating in a gaming session on the wagering game machine 202. During stage 2, the player community server 206 transmits a sign-on notification to the wagering game machine 202. Thus, the wagering game machine 202 is aware that the player has signed-on to a player community during the wagering game session. As a result, during stage 3, the wagering game machine 202 transmits a code to the mobile device 204. The code includes information about a wagering game being presented on the wagering game machine 202. For example, as described above, the code may include information indicating bonus game types, bonus game volatilities, etc. During stage 4, the mobile device 204 interprets the code and presents a hint 208, which reveals information included in the code. As a result, a player derives a benefit from signing on to a player community during a wagering game session on the wagering game machine 202.

In some embodiments, the code includes information that is revealed when the code is interpreted by a client on the mobile device 204. In other embodiments, the code is associated with information that can be revealed by the client. For example, the code may be an index into a database containing information about wagering games occurring on the wagering game machine 202. Alternatively, the code may include an internet address that, when accessed, reveals wagering game information.

Although FIG. 2 shows the mobile device 204 transmitting sign-on information directly to the player community server 206, some embodiments operate differently. In some embodiments, the mobile device 204 transmits player community sign-on information to the wagering game machine 202, which in turn forwards the information to the player community server 206. In any event, the system 200 enables players to sign-on to a player community during a wagering game session.

Figure 3:
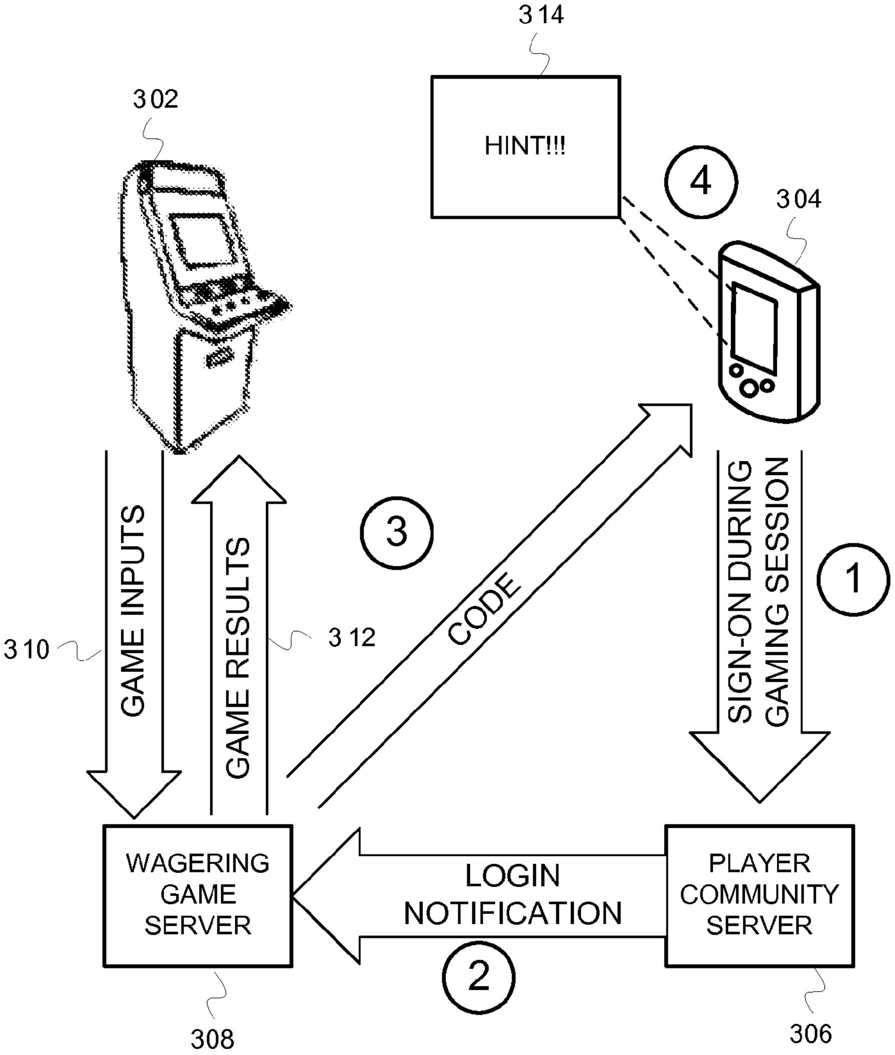
FIG. 3 is a block diagram illustrating components, operations, and dataflow for a system that provides hints about wagering games, according to some embodiments of the invention.

Although not shown in FIG. 2, some embodiments of the inventive subject matter operate with a wagering game server. FIG. 3 shows an example of how such embodiments may operate.

FIG. 3 is a block diagram illustrating components, operations, and dataflow for a system that provides hints about wagering games, according to some embodiments of the invention. In FIG. 3, a system 300 includes a wagering game machine 302, mobile device 304, player community server 306, and wagering game server 308. In the system 300, the wagering game machine 302 operates as a client for the wagering game server 308. That is, the wagering game machine 302 can receive player input and provide the input to the wagering game server 308. The wagering game server 308 can process the input, determine game results, and provide the results to the wagering game machine 302 for presentation (see arrows 310 & 312). FIG. 3 shows operations occurring in three stages.

During stage 1, the mobile device 304 facilitates sign-on to a player community. In some instances, the mobile device 304 includes a client that transmits a player's sign-on credentials to the player community server 306. Stage 1 occurs while a player (not shown) is participating in a wagering game session on the wagering same machine 302. That is, while a player is playing a wagering game on the wagering game machine 302, the player uses the mobile device 304 to sign-on to a player community.

During stage 2, the player community server 306 transmits a sign-on notification to the wagering game server 308. As noted above, the wagering game server 308 determines results for wagering games presented on the machine 102. The wagering game server 308 also makes determinations about when to send-out hints. During stage 3, the wagering game server 308 transmits a hint message to the mobile device 304. In some instances, the hint message includes a code which can include information that can be revealed upon interpreting the code. In some instances, the code is associated with information that can be revealed to the player (e.g., the code can be a link to a webpage that reveals game-related information). During stage 4, the mobile device 304 reveals a hint 314 about a wagering game being presented on the machine 302. For example, the hint may indicate bonus game types, bonus game volatilities, or statistics associated with selectable graphical game elements.

Any of the systems shown in FIGS. 1-3 can operate with or without a wagering game server. That is, the systems in FIGS. 1-3 can be adapted so that wagering game results are determined by wagering game machines, or by wagering game servers. Moreover, in some embodiments, the wagering game machines are embodied on personal computing devices, and may reside outside casinos. Regardless of physical form, the wagering game machines can perform the operations described herein.

Example Components

This description continues with additional details about components that may be used with embodiments of the inventive subject matter.

Figure 4:
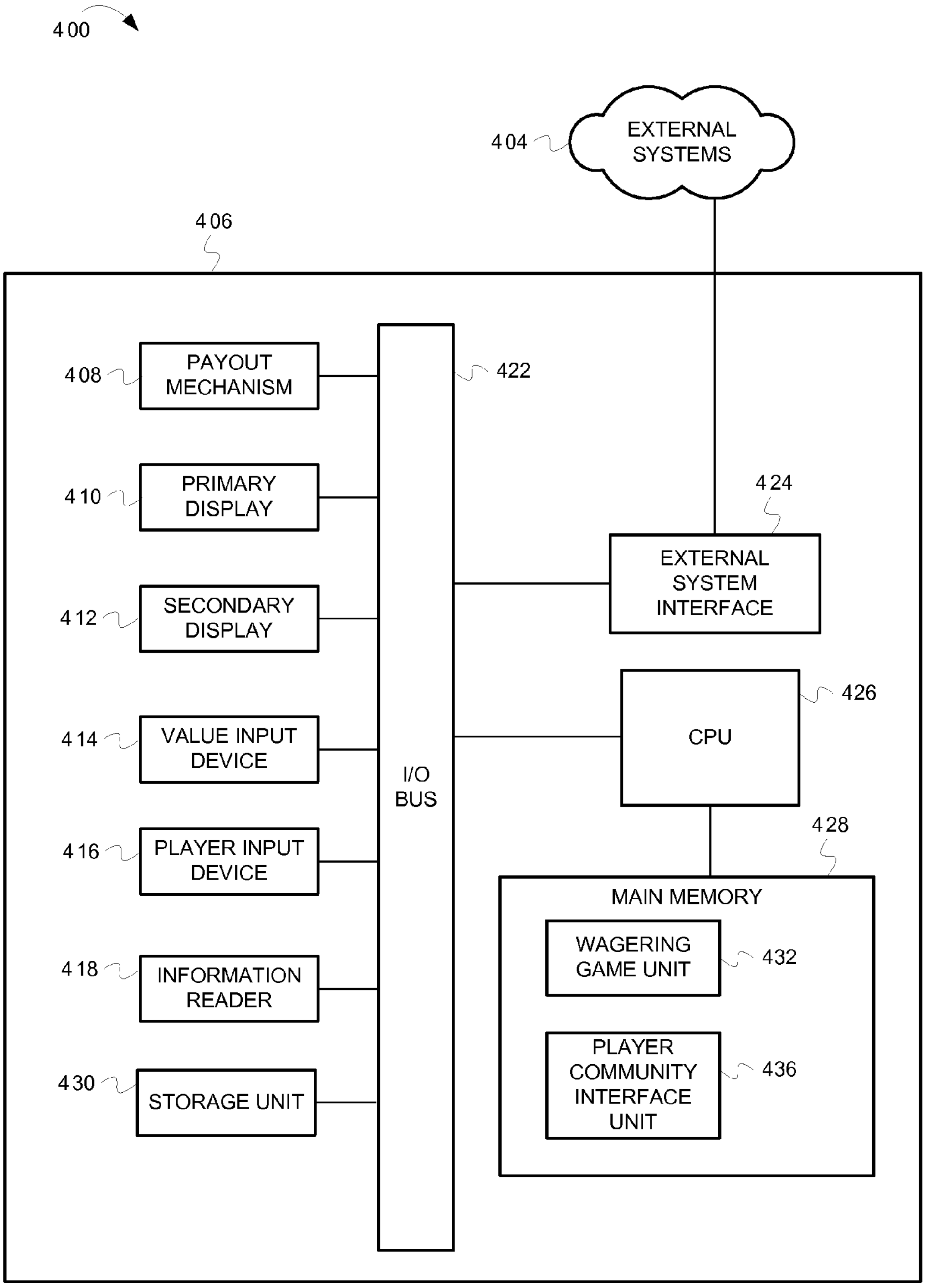
FIG. 4 is a block diagram illustrating a wagering game machine, according to example embodiments of the invention.

FIG. 4 is a block diagram illustrating a wagering game machine, according to example embodiments of the invention. As shown in FIG. 4, the wagering game machine 400, which includes a central processing unit (CPU) 426 connected to main memory 428. The CPU 426 can include any suitable processor, such as an Intel® Pentium processor, Intel® Core 2 Duo processor, AMD Opteron™ processor, or UltraSPARC processor. The main memory 428 includes a wagering game unit 432 and a player community interface unit 436. In one embodiment, the wagering game unit 432 can present wagering games, such as video poker, video black jack, video slots, video lottery, etc., in whole or part. The player community interface unit 432 can exchange messages with a player community server (not shown). The player community interface unit 432 can also perform operations for presenting hints (e.g., interpreting codes, rendering web content, etc.).

The CPU 426 is also connected to an input/output (I/O) bus 422, which can include any suitable bus technologies, such as an AGTL+ frontside bus and a PCI backside bus. The I/O bus 422 is connected to a payout mechanism 408, primary display 410, secondary display 412, value input device 414, player input device 416, information reader 418, and storage unit 430. The player input device 416 can include the value input device 414 to the extent the player input device 416 is used to place wagers. The I/O bus 422 is also connected to an external system interface 424, which is connected to external systems 404 (e.g., wagering game networks).

In one embodiment, the wagering game machine 406 can include additional peripheral devices and/or more than one of each component shown in FIG. 4. For example, in one embodiment, the wagering game machine 406 can include multiple external system interfaces 424 and/or multiple CPUs 426. In one embodiment, any of the components can be integrated or subdivided. Any component of the architecture 400 can include hardware, firmware, and/or machine-readable storage device(s) (a.k.a. computer-readable storage device(s)) including instructions for performing the operations described herein.

Figure 5:
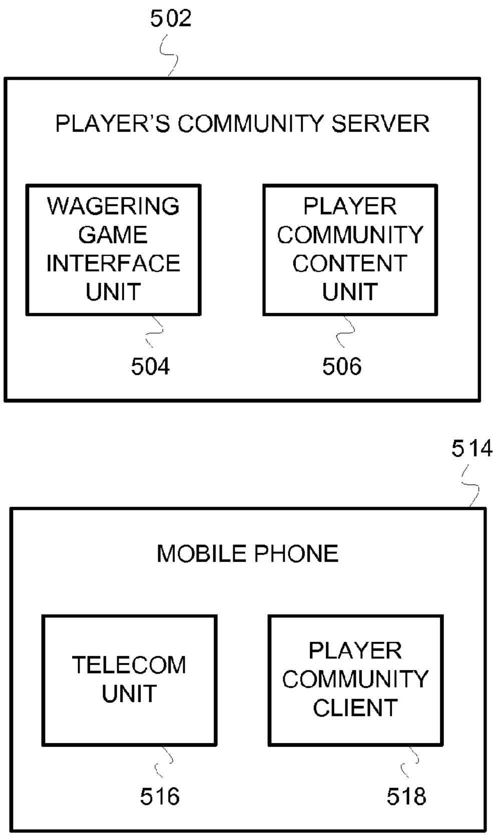
FIG. 5 is a block diagram illustrating wagering game system components, according to some embodiments of the subject matter.

FIG. 5 is a block diagram illustrating wagering game system components, according to some embodiments of the subject matter. In FIG. 5, a player community server 502 includes a player community content unit 506, wagering game interface unit 504, and player community client interface unit 507. The wagering game interface unit 504 can interact with wagering game machines and wagering game servers. In some instances, the wagering game interface unit 504 can receive player community sign-on credentials from wagering game machines and wagering game servers. In response, interface unit 504 can authenticate the credentials and the complete sign-on process. In some embodiments, the wagering game interface unit 504 transmits, to a wagering game machine or wagering game server, an indication whether the sign-on process was successful. The player community server's player community content unit 506 can perform operations for managing blogs, chat rooms, social networking applications, etc.

The player community client interface unit 507 can interact with player community clients residing on mobile devices. For example, the player community client interface unit 507 can process sign-on requests, and exchange information with player community clients. The player community client interface unit 507 facilitates use of the player community server 502 by mobile devices.

The wagering game server 508 includes a wagering game unit 510 and player community interface unit 512. The wagering game unit 510 can: 1) process player inputs received from wagering game machines, 2) determine game results, 3) communicate game results to wagering game machine, 4) and perform other operations for presenting wagering games on wagering game machines. The mobile device 514 includes a telecommunications unit 516 and player community client 518. The mobile device 514 can be a cell phone, smart phone, personal digital assistant, or other mobile network-enabled computing device. The telecommunications unit 516 can perform operations for facilitating wireless communications, such as cellular telephony, WiFi, and any other suitable wireless communications. The player community client 518 can interact with the player community server's player community client interface unit 507. The client 518 can transmit sign-on requests, and exchange information necessary for accessing player communities hosted by the player community server 502. In some embodiments, the client 518 can present hints about wagering games occurring on remote wagering game machines. As part of a process for presenting such hits, the client 518 can interpret codes, present web content, and perform other operations for revealing information about wagering games occurring on remote wagering game machines.

Any of the components described herein can include any combination of one or more computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart(s) and/or block diagram(s).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagrams.

Example Operations

This section describes operations associated with some embodiments of the invention. In the discussion below, the flow diagrams may be described with reference to the block diagrams presented above. However, in some embodiments, the operations can be performed by components not described in the block diagrams. In some embodiments, the operations can be performed in series, while in other embodiments, one or more of the operations can be performed in parallel. Moreover, some embodiments can perform less than all the operations shown in any flow diagram.

Figure 6:
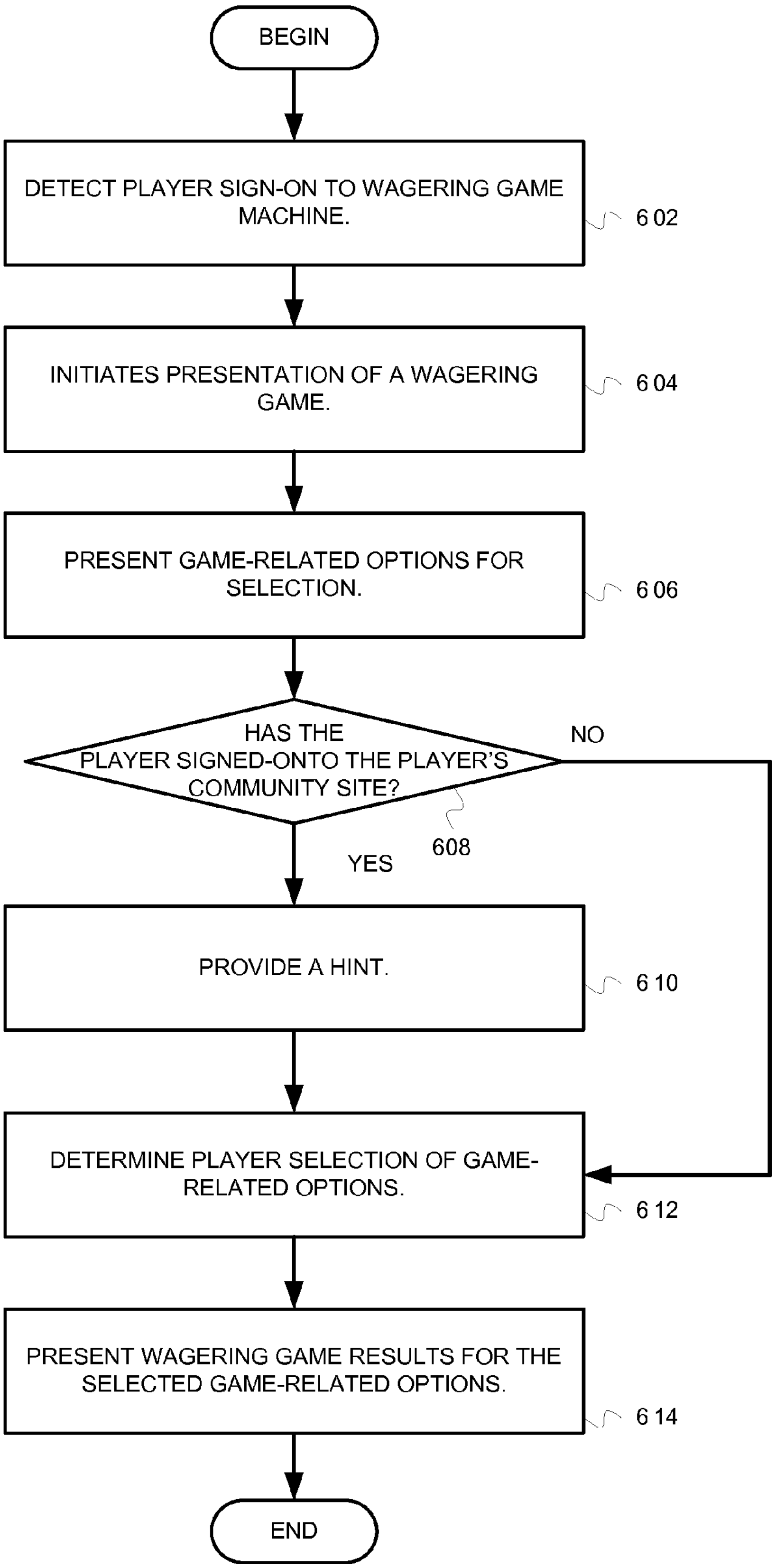
FIG. 6 is a flow diagram illustrating operations for providing wagering game information, according to some embodiments of the invention.

The section will discuss FIG. 6.

FIG. 6 is a flow diagram illustrating operations for providing wagering game information, according to some embodiments of the invention. In FIG. 6, the flow 600 begins at block 602, where a wagering game machine detects player sign-on. For example, the wagering game machine may detect a player card including player credentials, and entry of a password or other secret credential. The flow continues at block 604.

At block 604, the wagering game machine initiates a gaming session in which it presents a wagering game. The flow continues at block 606, where the wagering game machine presents game-related options for player selection. For example, the machine may present player-selectable graphical game elements (e.g., as similarly shown in FIG. 1), or otherwise solicit a player selection in association with a wagering game (e.g., request input the a keyboard, joystick, etc.). Each game option may be associated with a game type, bonus game type, or other suitable game option. The flow continues at block 608.

At block 608, the wagering game machine determines whether the player has signed-on to a player community website during the gaming session. Alternatively, instead of determining whether the player signed-on the player community during the wagering game session, the machine may determine whether a player is a member of a player community (e.g., by exchanging messages with a player community server, by looking-up such information in a local data store, etc.). In some embodiments, the wagering game machine facilitates sign-on to the player community. Alternately, players can use mobile devices to sign-on to player communities. For such embodiments, the wagering game machine may receive, from a player community server, a message indicating a successful sign-on to the player community.

If the player did not sign-on to the player community website, the flow continues at block 612. However, if the player did sign-on to the player community website (or is a player community member, for some embodiments), the flow continues at block 610.

At block 610, the wagering game machine provides a hint about one or more wagering games. In some instances, the wagering game machine presents the hint on its own display device. In other embodiments, the wagering game machine transmits a code to a player's mobile device, where a mobile device client interprets the code and reveals the hint. In other embodiments, other components may provide the hint (e.g., wagering game server may provide the hint). In some instances, the hint may reveal wagering game types (e.g., picking game, free-spin game, cash award game, high volatility game, low volatility game, etc.). In other embodiments, the hint reveals statistics about a base game or bonus game (e.g., a win rate over some given time, a number of recent wins versus recent losses, etc.). In yet other embodiments, the hint reveals information that affects a wagering game's expected value (e.g., revealing a card that other players cannot see, or any other information that can affect a game's expected value). From block 610, the flow continues at block 612.

At block 612, the wagering game machine determines which game-related options were selected. For example, the machine determines which of a plurality of graphical game elements was selected by a player. Alternatively, the machine determines what option was selection based on other input, such as button input, joystick input, etc. Because the wagering game machine provided a hint including information about a wagering game, the player will be informed about the game options. As a result, the player can select the player's preferred game options. The flow continues at block 614.

At block 614, the wagering game machine presents wagering game results for the selected game options. From block 614, the flow ends.

Although some operations were described as being performed by wagering game machines, other embodiments may operate differently. For example, some embodiments have one or more of those operations being performed by a wagering game server. Moreover, in some embodiments, wagering game machines are included in personal computers, where the wagering game machines operate in concert with wagering game servers over a network connection.

More About Wagering Game Machines

Figure 7:
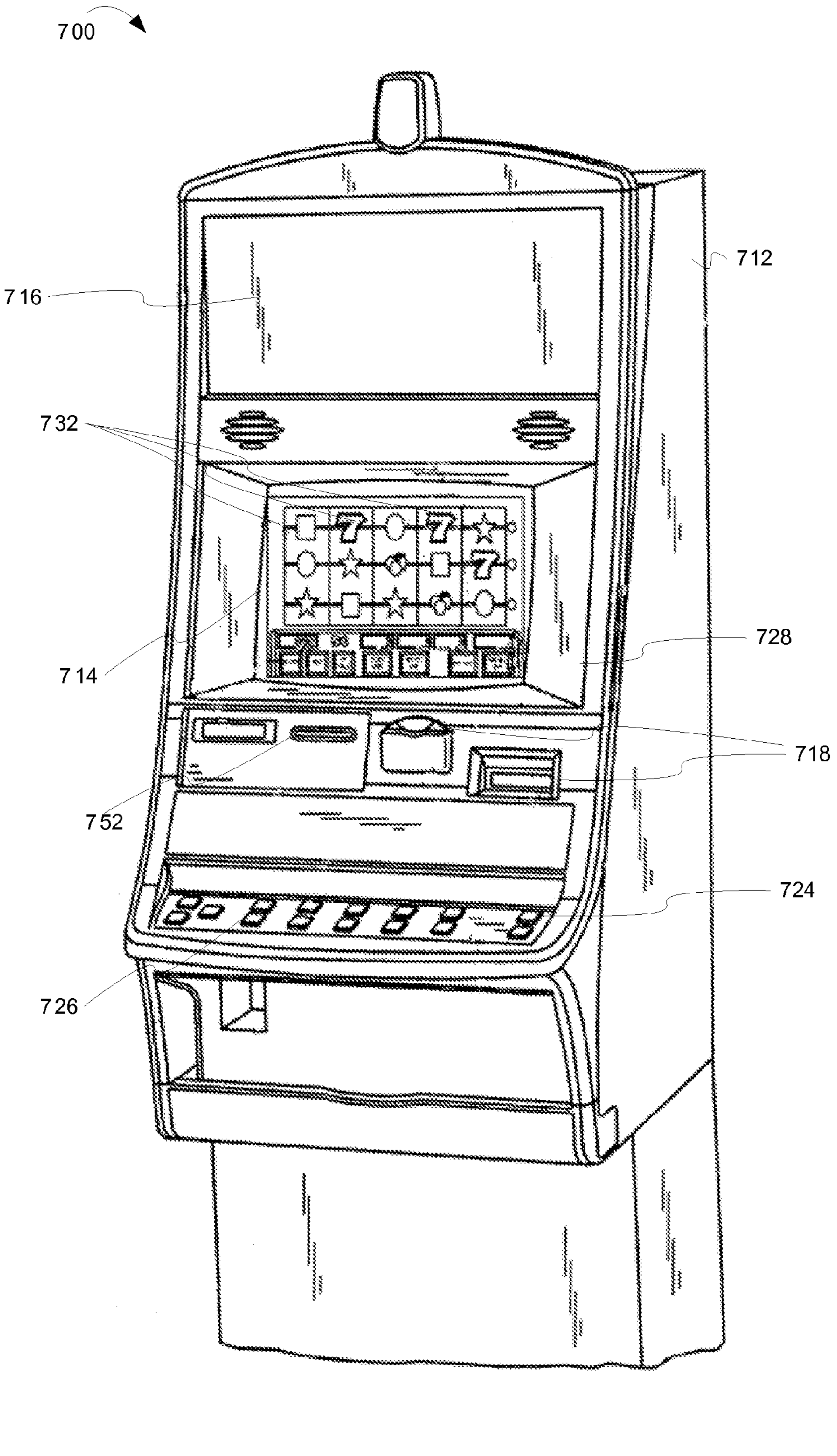
FIG. 7 is a perspective view of a wagering game machine, according to example embodiments of the invention.

FIG. 7 is a perspective view of a wagering game machine, according to example embodiments of the invention. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

In some embodiments, the wagering game machine 700 can determine whether a player has signed-on to a player community. If the player has signed-on to a player community, the wagering game machine can provide information about wagering games. In some embodiments, the information tells how to select particular game types, or make other choices in a wagering game. Without the information, players select those particular game types by chance (e.g., by coincidentally selecting the game option that corresponds to a particular game type). The wagering game machine 700 can include any of the components, perform any of the operations, and facilitate any of the data flow described herein.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer-readable storage medium interface. In some embodiments, the information reader 752 can be used to award complimentary services, restore game assets, track player habits, etc.

Wagering Game Networks

Figure 8:
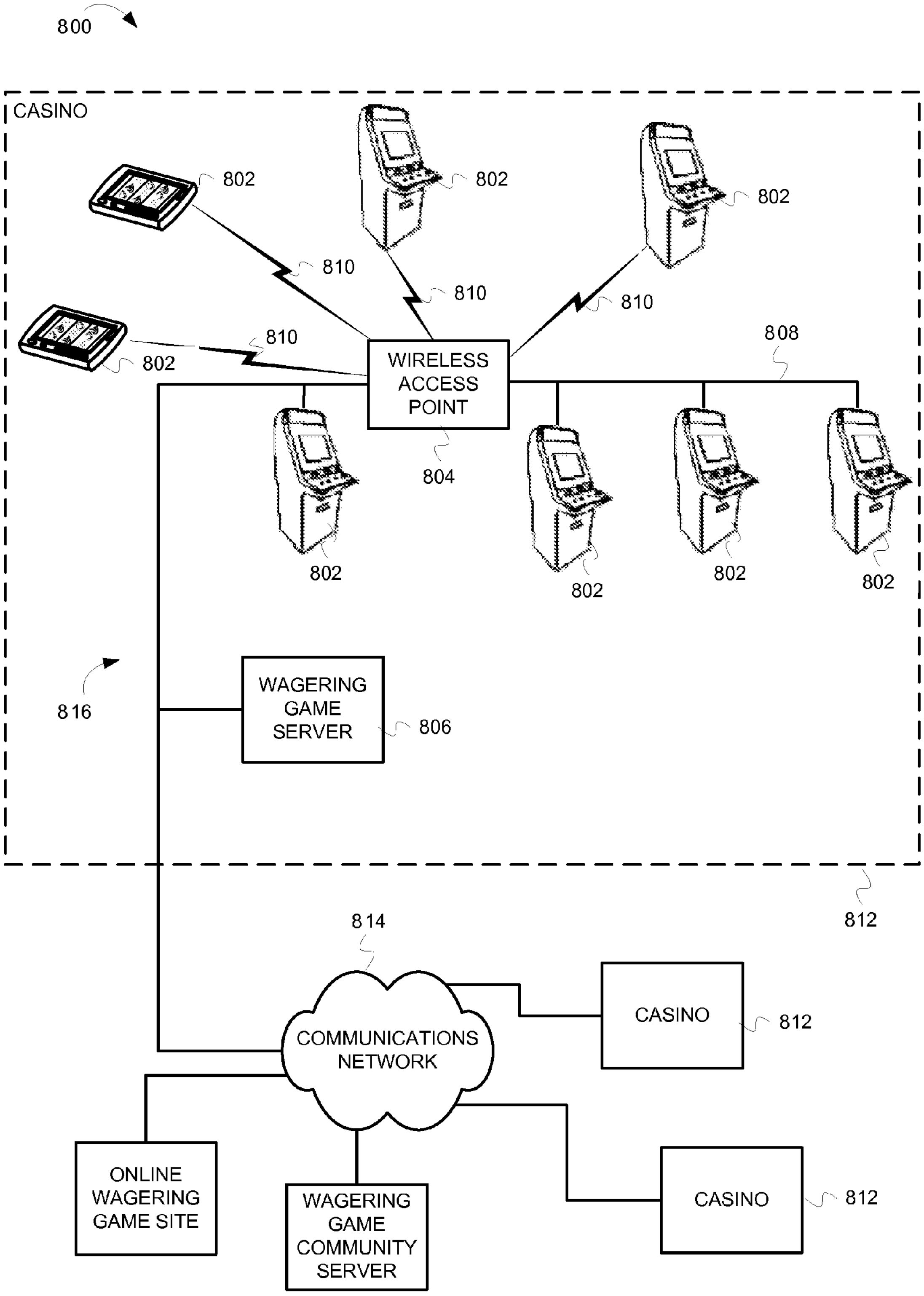
FIG. 8 is a block diagram illustrating a wagering game network, according to example embodiments of the invention.

FIG. 8 is a block diagram illustrating a wagering game network, according to example embodiments of the invention. According to some embodiments, the components and systems described herein can reside in wagering game networks. As shown in FIG. 8, a wagering game network 800 includes a plurality of casinos 812 connected to a communications network 814.

Each casino 812 includes a local area network 816, which includes an access point 804, a wagering game server 806, and wagering game machines 802. The access point 8304 provides wireless communication links 810 and wired communication links 808. The wired and wireless communication links can employ any suitable connection technology, such as Bluetooth, 802.11, Ethernet, public switched telephone networks, SONET, etc. In some embodiments, the wagering game server 806 can serve wagering games and distribute content to devices located in other casinos 812 or at other locations on the communications network 814.

The wagering game machines 802 described herein can take any suitable form, such as floor standing models, handheld mobile units, bartop models, workstation-type console models, etc. Further, the wagering game machines 802 can be primarily dedicated for use in conducting wagering games, or can include non-dedicated devices, such as mobile phones, personal digital assistants, personal computers, etc. In one embodiment, the wagering game network 800 can include other network devices, such as accounting servers, wide area progressive servers, player tracking servers, and/or other devices suitable for use in connection with embodiments of the invention.

In some embodiments, wagering game machines 802 and wagering game servers 806 work together such that a wagering game machine 802 can be operated as a thin, thick, or intermediate client. For example, one or more elements of game play may be controlled by the wagering game machine 802 (client) or the wagering game server 806 (server). Game play elements can include executable game code, lookup tables, configuration files, game outcome, audio or visual representations of the game, game assets or the like. In a thin-client example, the wagering game server 806 can perform functions such as determining game outcome or managing assets, while the wagering game machine 802 can present a graphical representation of such outcome or asset modification to the user (e.g., player). In a thick-client example, the wagering game machines 802 can determine game outcomes and communicate the outcomes to the wagering game server 806 for recording or managing a player's account.

In some embodiments, either the wagering game machines 802 (client) or the wagering game server 806 can provide functionality that is not directly related to game play. For example, account transactions and account rules may be managed centrally (e.g., by the wagering game server 806) or locally (e.g., by the wagering game machine 802). Other functionality not directly related to game play may include power management, presentation of advertising, software or firmware updates, system quality or security checks, etc.

Any of the wagering game network components (e.g., the wagering game machines 802) can include hardware and one or more machine-readable storage devices storing instructions for performing the operations described herein. In some embodiments, machine readable storage devices can include semiconductor memory devices (e.g., random access memory devices), magnetic memory devices (e.g., hard disk drives), optical memory devices (e.g., DVDs), and/or any other suitable tangible storage devices.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a gaming system, the gaming system including one or more controllers and a wagering game machine, the wagering game machine including an electronic display device and one or more electronic input devices, the method comprising:

presenting a casino wagering game on the wagering game machine;

detecting, via at least one of the one or more electronic input devices, a physical item associated with a monetary value that establishes a credit balance;

initiating the casino wagering game in response to an input indicative of a wager covered by the credit balance;

detecting, during the casino wagering game, a trigger for a bonus game;

presenting player-selectable bonus game options without presenting bonus game types associated with the player-selectable bonus game options, wherein the presenting is on the electronic display device of the wagering game machine;

detecting sign-on to an account on a player community server;

as a result of the detecting the sign-on to the account, presenting a hint on the electronic display device of the wagering game machine, wherein the hint indicates the bonus game types associated with the player-selectable bonus game options;

detecting selection of one of the player-selectable bonus game options, wherein the one of the player-selectable bonus game options is associated with a particular one of the bonus game types;

presenting a bonus game of the particular one of the bonus game types; and receiving, via at least one of the one or more electronic input devices, a cashout input that initiates a payout from the credit balance.

2. The method of claim 1 further comprising:

receiving, at the wagering game machine, player sign-on information needed to sign-on to the account on the player community server;

transmitting the player sign-on information to the player community server.

3. The method of claim 1, wherein the hint does not include information that can affect an expected value of the casino wagering game.

4. The method of claim 1, wherein the wagering game machine includes a personal computer, and wherein results for the bonus game are determined by a wagering game server remote from the wagering game machine.

5. The method of claim 1, wherein the hint is included in a code received from a wagering game server, wherein the wagering game server determines results for the bonus game.

6. One or more machine-readable storage media including instructions that, when executed by a wagering game machine including one or more electronic input devices, cause the wagering game machine to perform operations comprising:

detecting, via at least one of the one or more electronic input devices, a physical item associated with a monetary value that establishes a credit balance;

initiating a wagering game on the wagering game machine in response to an input indicative of a wager covered by the credit balance;

providing a plurality of player-selectable game options to members of a player community and to non-members of the player community;

detecting that a player is a member of the player community via activation of a community website account;

requesting input indicating selection of one of the plurality of player-selectable game options for the wagering game, wherein selection of the one of the plurality of player-selectable game options does not affect an expected value for the wagering game;

transmitting, prior to receipt of the input indicating selection of the one of the plurality of player-selectable game options, a code that includes information about each of the plurality of player-selectable game options to the player, the transmitting occurring as a result of the detecting that the player is a member of the player community;

detecting selection of the one of the plurality of player-selectable game options;

presenting wagering game content associated with the one of the plurality of player-selectable game options to members of the player community and to non-members of the player community; and receiving, via at least one of the one or more electronic input devices, a cashout input that initiates a payout from the credit balance.

7. The one or more machine-readable storage media of claim 6, wherein the operations include:

interpreting the code to reveal the information; and presenting the information on a display device.

8. The one or more machine-readable storage media of claim 7, wherein the display device is part of a mobile phone remote from the wagering game machine.

9. The one or more machine-readable storage media of claim 8, wherein the information indicates one or more of: bonus game types, statistics about past wagering games, statistics about the wagering game, and information about the expected value.

10. The one or more machine-readable storage media of claim 6, wherein the detecting that a players community website account has been activated includes transmitting one or more messages to the players community website, and receiving one or more messages from the players community website.

11. A wagering game system comprising:

a wagering game server configured to receive player inputs from wagering game machines, each wagering game machine including an electronic display device and one or more electronic input devices;

identify players that are members of a player community;

provide player-selectable game options to wagering game machines being used by players that are members of the player community and to wagering game machines being used by players that are not members of the player community;

provide information that explains the player-selectable game options, the information provided only to the wagering game machines that are being used by the players that are members of the player community;

determine results of casino wagering games; and transmit the results of the casino wagering games to the wagering game machines that are being used by the players that are members of the player community; and each wagering game machine configured to detect, via at least one of the one or more electronic input devices, a physical item associated with a monetary value that establishes a credit balance;

initiate the casino wagering games in response to an input indicative of a wager covered by the credit balance;

transmit the player inputs to the wagering game server;

present, via the electronic display device, the player-selectable game options;

present, prior to receiving player selection of any of the player-selectable game options, the information to the players that are members of the player community;

present, via the electronic display device, media indicating the results of the casino wagering games; and receive, via at least one of the one or more electronic input devices, a cashout input that initiates a payout from the credit balance.

12. The wagering game system of claim 11 further comprising:

a player community server configured to host the player community, and to identify the players that are members of the player community.

13. The wagering game system of claim 11 further comprising:

a mobile device client configured to receive a code including the information;

interpret the code to reveal the information; and present the information on another electronic display device.

14. The wagering game system of claim 13, wherein the wagering game server is further configured to exchange information with a player community server to identify the players that are members of the player community.

15. The wagering game system of claim 11, wherein the player-selectable game options are associated with bonus game types including picking type bonus games, cash award type bonus games, free spin type bonus games, high volatility bonus game types, and low volatility bonus game types.

16. An apparatus comprising:

means for presenting a wagering game on a wagering game machine, the wagering game machine including an electronic display device and one or more electronic input devices;

means for detecting, via at least one of the one or more electronic input devices, a physical item associated with a monetary value that establishes a credit balance;

means for initiating the wagering game in response to an input indicative of a wager covered by the credit balance;

means for detecting, during the wagering game, a trigger for a bonus game;

means for presenting player-selectable bonus game options without presenting a hint that indicates bonus game types associated with the player-selectable bonus game options, wherein the presenting is on the electronic display device of the wagering game machine;

means for detecting sign-on to a player community account;

means for presenting, as a result of the detecting the sign-on to the player community account, the hint on the electronic display device;

means for detecting selection of one of the player-selectable bonus game options, wherein the one of the player-selectable bonus game options is associated with a particular one of the bonus game types;

means for presenting a bonus game of the particular one of the bonus game types; and means for receiving, via at least one of the one or more electronic input devices, a cashout input that initiates a payout from the credit balance.

17. The apparatus of claim 16 further comprising:

means for receiving, at the wagering game machine, player sign-on information needed to sign-on to the player community account; and means for transmitting the player sign-on information to a players community website.

18. The apparatus of claim 16, wherein the hint does not include information that can affect an expected value of the wagering game.

19. The apparatus of claim 16, wherein the wagering game machine includes a personal computer, and wherein results for the bonus game are determined by a wagering game server remote from the wagering game machine.

20. The apparatus of claim 16, wherein the hint is included in a code received from a wagering game server, wherein the wagering game server determines results for the bonus game.

21. A wagering game machine comprising:

an electronic display device;

one or more electronic input devices;

a wagering game unit configured to detect, via at least one of the one or more electronic input devices, a physical item associated with a monetary value that establishes a credit balance, initiate a casino wagering game in response to an input indicative of a wager covered by the credit balance, present player-selectable game options to members of a player community and to non-members of the player community;

receive player inputs for the wagering game, wherein some of the player inputs indicate player selection of the player-selectable game options associated with the casino wagering game, determine results of the casino wagering game, present, via the electronic display device, the results of the casino wagering game, and receive, via at least one of the one or more electronic input devices, a cashout input that initiates a payout from the credit balance; and a player community interface unit configured to determine that a player is a member of the player community, and provide, prior to the player selection of the player-selectable game options and based on the determination that the player is a member of the player community, information that explains the player-selectable game options to the player.

22. The wagering game machine of claim 21, wherein provision of the information, by the player community interface unit, includes transmission of the information to a mobile device for presentation on the mobile device.

23. The wagering game machine of claim 21, wherein the player-selectable game options are for selection of a bonus game type.

24. The wagering game machine of claim 21, wherein determination that the player is a member of a player community includes transmission of a query to a player community server hosting the player community.

25. The wagering game machine of claim 21, wherein provision of the information, by the player community interface unit, includes presentation via the electronic display device of the wagering game machine.

* * * * *